US009451176B2

(12) United States Patent
Okada et al.

(10) Patent No.: US 9,451,176 B2
(45) Date of Patent: Sep. 20, 2016

(54) IMAGE SIGNAL PROCESSOR THAT REDUCES A FLICKER COMPONENT OF AN IMAGE SIGNAL DEPENDING ON A LEVEL CHANGE BETWEEN CONTINUOUS FRAMES

(71) Applicant: SONY CORPORATION, Tokyo (JP)

(72) Inventors: Sohhei Okada, Kanagawa (JP); Yoshiaki Nishide, Tokyo (JP); Yukihiro Kinoshita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/630,057

(22) Filed: Feb. 24, 2015

(65) Prior Publication Data
US 2015/0281546 A1    Oct. 1, 2015

(30) Foreign Application Priority Data
Mar. 28, 2014   (JP) ................................. 2014-069756

(51) Int. Cl.
  *H04N 5/235*   (2006.01)
(52) U.S. Cl.
  CPC .................................. *H04N 5/2357* (2013.01)
(58) Field of Classification Search
  CPC .................................................. H04N 5/23296
  USPC .................................................. 348/240.99
  See application file for complete search history.

(56) References Cited

U.S. PATENT DOCUMENTS

| | | | | |
|---|---|---|---|---|
| 9,264,628 B2* | 2/2016 | Shimoozono | ........ | H04N 5/2357 |
| 2007/0146501 A1* | 6/2007 | Matsuoka | .............. | H04N 5/235 348/226.1 |
| 2010/0053369 A1* | 3/2010 | Nagai | .................... | H04N 5/235 348/226.1 |
| 2012/0002074 A1* | 1/2012 | Baba | ...................... | H04N 5/235 348/228.1 |
| 2012/0162466 A1* | 6/2012 | Katagawa | ............ | H04N 5/2351 348/226.1 |
| 2014/0375848 A1* | 12/2014 | Yamamoto | ........... | H04N 5/2355 348/241 |
| 2015/0229824 A1* | 8/2015 | Tanaka | .................... | H04N 5/217 348/228.1 |

FOREIGN PATENT DOCUMENTS

| | | |
|---|---|---|
| JP | 2000-324365 | 11/2000 |
| JP | 2007-295200 | 11/2007 |

* cited by examiner

Primary Examiner — Roberto Velez
Assistant Examiner — Cynthia Segura
(74) Attorney, Agent, or Firm — Oblon, McClelland, Maier & Neustadt, L.L.P.

(57) ABSTRACT

Provided is an image signal processor, including: an integrator configured to integrate each frame of an image signal; a first flicker corrector configured to extract a flicker component from the integrated value obtained by the integrator, the flicker component depending on a frequency of a light source, and to reduce a flicker component from the integrated value sequentially; and a second flicker corrector configured to generate a reference image without a flicker component based on the correction result of the integrated value corrected by the first flicker corrector, and to correct a flicker of the image signal based on the reference image.

7 Claims, 6 Drawing Sheets

IMAGE SIGNAL PROCESSOR THAT REDUCES A FLICKER COMPONENT OF AN IMAGE SIGNAL DEPENDING ON A LEVEL CHANGE BETWEEN CONTINUOUS FRAMES

CROSS REFERENCE TO RELATED APPLICATIONS

This application claims the benefit of Japanese Priority Patent Application JP 2014-069756 filed Mar. 28, 2014, the entire contents of which are incorporated herein by reference.

BACKGROUND

The present technology relates to an image signal processor, an image signal processing method, and a program for correcting a flicker of an image signal.

An image sensor accumulates electric charge at a different point in time depending on each surface or line. In general, a so-called global-shutter-type image sensor selects when to accumulate electric charge of each surface. A so-called rolling-shutter-type image sensor selects when to accumulate electric charge of each line. In the past, global-shutter-type CCD image sensors have been used mainly. However, in recent years, CMOS image sensors are the focus of attention. A CMOS image sensor uses less power than a CCD image sensor does. The number of components of a CMOS image sensor is smaller than that of a CCD image sensor. The manufacturing cost of a CMOS image sensor is smaller than that of a CCD image sensor. Most CMOS image sensors are rolling-shutter type because of structural difficulties. In both the types, when an image is taken with a blinking light source, contrast is found in surfaces (surface flicker) or contrast is found in lines (line flicker) depending on a point of time at which a sensor accumulates electric charge.

As a technology of correcting a flicker, there is known a method of approximating the phase and amplitude of a flicker to thereby generate a waveform such as a sine wave, and correcting a flicker of an image signal based on the waveform (see Japanese Patent Application Laid-open No. 2007-295200). This method has resistance to change of a level. Further, there is also known a method of calculating the arithmetic mean of integrated values of pixel values of each frame of the integral multiple of a flicker cycle to thereby generate a reference image from which a flicker component is removed, and correcting a flicker of an image signal by using the reference image (see Japanese Patent Application Laid-open No. 2000-324365). This method is vulnerable to change of a level, but its correction accuracy is high.

SUMMARY

Each method has both merits and demerits. It is pointed out that each method removes a flicker component from an image signal insufficiently.

In view of the above-mentioned circumstances, it is desirable to provide an image signal processor, an image signal processing method, and a program capable of removing a flicker component from an image signal successfully.

According to an embodiment of the present technology, there is provided an image signal processor, including: an integrator configured to integrate each frame of an image signal; a first flicker corrector configured to extract a flicker component from the integrated value obtained by the integrator, the flicker component depending on a frequency of a light source, and to reduce a flicker component from the integrated value sequentially; and a second flicker corrector configured to generate a reference image without a flicker component based on the correction result of the integrated value corrected by the first flicker corrector, and to correct a flicker of the image signal based on the reference image.

According to an embodiment of the present technology, the image signal processor may further include a level-change detector configured to detect a significant level change between continuous frames, in which the second flicker corrector may further include a storage, the storage being capable of storing integrated values of a predetermined number of frames, the predetermined number being determined depending on a power-source frequency and a frame rate of the light source, and the second flicker corrector may be configured to, if the level change is not detected, calculate the average of integrated values of a predetermined number of latest frames stored in the storage to thereby generate the reference image.

The second flicker corrector may be configured to, if the level change is detected, correct a flicker of the image signal based on the integrated value output from the first flicker corrector as the reference image.

The level-change detector may be configured to detect the level change based on the integrated value corrected by the first flicker corrector.

According to another embodiment of the present technology, there is provided an image signal processor, including: an integrator configured to integrate each line of an image signal; a first flicker corrector configured to extract a flicker component from the integrated value of each line obtained by the integrator, the flicker component depending on a frequency of a light source, and to reduce a flicker component from the integrated value of each line sequentially; and a second flicker corrector configured to generate a reference image without a flicker component based on the correction result of the integrated value of each line corrected by the first flicker corrector, and to correct a flicker of the image signal based on the reference image.

Further, according to another embodiment of the present technology, there is provided an image signal processing method, including: integrating, by an integrator, each frame of an image signal; extracting, by a first flicker, a flicker component from the integrated value obtained by the integrator, the flicker component depending on a frequency of a light source, and reducing a flicker component from the integrated value sequentially; and generating, by a second flicker corrector, a reference image without a flicker component based on the correction result of the integrated value corrected by the first flicker corrector, and correcting a flicker of the image signal based on the reference image.

Further, according to another embodiment of the present technology, there is provided an image signal processing method, including: integrating, by an integrator, each line of an image signal; extracting, by a first flicker corrector, a flicker component from the integrated value of each line obtained by the integrator, the flicker component depending on a frequency of a light source, and reducing a flicker component from the integrated value of each line sequentially; and generating, by a second flicker corrector, a reference image without a flicker component based on the correction result of the integrated value of each line corrected by the first flicker corrector, and correcting a flicker of the image signal based on the reference image.

According to another embodiment of the present technology, there is provided a program, configured to cause a computer to function as: an integrator configured to integrate each frame of an image signal; a first flicker corrector configured to extract a flicker component from the integrated value obtained by the integrator, the flicker component depending on a frequency of a light source, and to reduce a flicker component from the integrated value sequentially; and a second flicker corrector configured to generate a reference image without a flicker component based on the correction result of the integrated value corrected by the first flicker corrector, and to correct a flicker of the image signal based on the reference image.

Further, according to another embodiment of the present technology, there is provided a program, configured to cause a computer to function as: an integrator configured to integrate each line of an image signal; a first flicker corrector configured to extract a flicker component from the integrated value of each line obtained by the integrator, the flicker component depending on a frequency of a light source, and to reduce a flicker component from the integrated value of each line sequentially; and a second flicker corrector configured to generate a reference image without a flicker component based on the correction result of the integrated value of each line corrected by the first flicker corrector, and to correct a flicker of the image signal based on the reference image.

As described above, according to the present technology, it is possible to remove a flicker component from an image signal successfully.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present technology will be described with reference to the drawings.

First Embodiment

Firstly, in the embodiment described hereinafter, an image signal processor of the present technology is applied to a flicker corrector for a global-shutter-type image sensor.

Figure 1:
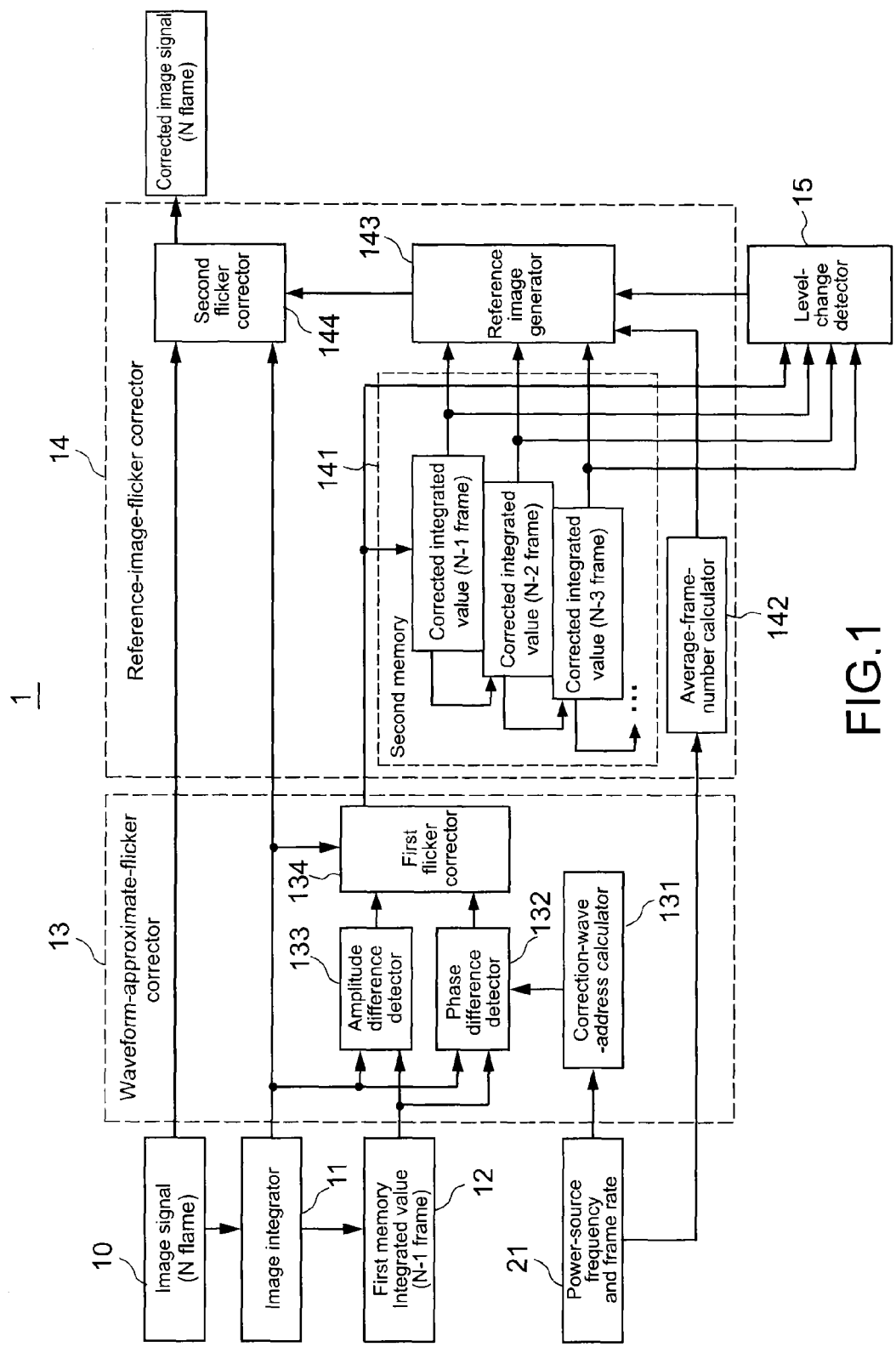
FIG. 1 is a block diagram showing the configuration of the flicker corrector of the first embodiment of the present technology.

FIG. 1 is a block diagram showing the configuration of the flicker corrector 1.

The flicker corrector 1 includes the image integrator 11, the first memory 12, the waveform-approximate-flicker corrector 13, the reference-image-flicker corrector 14, and the level-change detector 15.

The image integrator 11 integrates values (e.g., brightness values) of the pixels of respective frames of an input image signal 10.

The image integrator 11 thereby obtains integrated values of the frames. The first memory 12 stores the integrated value of the frame (N−1 frame) immediately before the present frame (N frame).

The waveform-approximate-flicker corrector 13 approximates the phase and amplitude of a flicker, and thereby generates a waveform such as a sine wave. The waveform-approximate-flicker corrector 13 corrects the integrated value, which is output from the image integrator 11, based on the waveform. The waveform-approximate-flicker corrector 13 thereby performs primary flicker correction. Here, the primary flicker correction means not to correct a flicker of an actual image signal, but to remove a flicker component from the integrated value of each frame.

The reference-image-flicker corrector 14 generates a reference image of each frame of the integral multiple of a flicker cycle. The generated reference image has a less flicker component. The reference image is the integrated value of each frame, which is corrected by the waveform-approximate-flicker corrector 13. Alternatively, the reference image is the arithmetic mean of the integrated values of a plurality of frames, which are corrected by the waveform-approximate-flicker corrector 13. The reference-image-flicker corrector 14 corrects a flicker of an image signal based on the reference image and based on the integrated value output from the image integrator 11.

The level-change detector 15 notifies the reference-image-flicker corrector 14 that a level-change point (frame) is detected. Then the reference-image-flicker corrector 14 generates, as a reference image, the integrated value of each frame, which is corrected by the waveform-approximate-flicker corrector 13. The reference-image-flicker corrector 14 performs secondary flicker correction of an image signal based on the reference image.

The level-change detector 15 detects a large level-change point (frame) resulting from for example a large movement (change) or the like of an image based on the differential between the integrated value of N frame and the integrated value of N−1 frame, which are corrected by the waveform-approximate-flicker corrector 13, and the like. If the level-change detector 15 detects a large level-change point (frame), the level-change detector 15 notifies the reference-image-flicker corrector 14 of a signal showing the level-change point.

Next, the configurations of the waveform-approximate-flicker corrector 13, the reference-image-flicker corrector 14, and the level-change detector 15 will be described in detail.

[The Waveform-Approximate-Flicker Corrector 13]

According to one system, a flicker component is extracted from an integrated value, the flicker component depending on a frequency of a light source, and a flicker component is reduced from the integrated value sequentially. Specifically, the phase and amplitude of a flicker are approximated, a waveform such as a sine wave is thereby generated, and the integrated value, which is output from the image integrator 11, is corrected based on the waveform. The waveform-approximate-flicker corrector 13 of this embodiment is an example of such a system. Various kinds of such a waveform-approximate-flicker corrector 13 are known. One example of the waveform-approximate-flicker corrector 13 is as follows.

The waveform-approximate-flicker corrector 13 includes the correction-wave-address calculator 131, the phase difference detector 132, the amplitude difference detector 133, and the first flicker corrector 134.

The correction-wave-address calculator 131 calculates the address of a correction wave corresponding to N frame based on the power-source frequency and frame rate 21 and based on the correction result of the previous frame (N−1 frame).

The phase difference detector 132 calculates a difference between the phase of a correction wave and the phase of a flicker component of an image signal as follows.

The correction-wave-address calculator 131 calculates the address of a correction wave. The phase difference detector 132 shifts the address in the positive (+) direction and the negative (−) direction, and thereby calculates addresses. The phase difference detector 132 calculates two pieces of flicker-correction data based on the addresses.

The phase difference detector 132 processes each of the two pieces of calculated flicker-correction data as follows. The phase difference detector 132 calculates corrected values of the respective pixels based on the flicker-correction data and based on the integrated value of N−1 frame corrected by the first flicker corrector 134. The phase difference detector 132 adds the corrected values (flicker component) of the respective pixels to the corrected image signal of N−1 frame.

By adding the flicker component, the pixel values of N−1 frame are corrected. The phase difference detector 132 integrates the pixel values of N−1 frame in the frame unit. The phase difference detector 132 generates differential data between the integrated value of N−1 frame and the integrated value of N frame. Further, the phase difference detector 132 compares the differential data value obtained based on the address shifted in the positive (+) direction with the differential data value obtained based on the address shifted in the negative (−) direction, and determines the smaller differential data value. The phase difference detector 132 outputs a phase-difference signal to the first flicker corrector 134 to instruct to shift the phase in the positive (+) direction or the negative (−) direction, based on which the smaller differential data value is obtained.

In other words, the phase difference detector 132 determines one of the address of a correction wave shifted in the positive (+) direction and the address of a correction wave shifted in the negative (−) direction, which may be closer to the real flicker. The phase difference detector 132 supplies one of a positive (+) phase-difference signal and a negative (−) phase-difference signal, which may be closer to the real flicker, to the first flicker corrector 134.

The above-mentioned processing is repeated for each frame. As a result, the phase of a correction wave will gradually become closer to the phase of the flicker component of the actual image signal.

The amplitude difference detector 133 calculates a difference between the amplitude of a correction wave and the amplitude of the flicker component of an image signal as follows.

The correction-wave-address calculator 131 calculates the address of the correction wave. The amplitude difference detector 133 calculates flicker-correction data based on the address. Further, the amplitude difference detector 133 amplifies a flicker-amplitude signal, and attenuates the flicker-amplitude signal. The amplitude difference detector 133 multiplies the amplified signal by the flicker-correction data, and multiplies the attenuated signal by the flicker-correction data. As a result, the amplitude difference detector 133 generates flicker-correction data having an amplified flicker component, and flicker-correction data having an attenuated flicker component.

The amplitude difference detector 133 processes each of the two pieces of calculated flicker-correction data as follows. The amplitude difference detector 133 calculates corrected values of the respective pixels based on the flicker-correction data and based on the image signal of N−1 frame corrected by the first flicker corrector 134. The amplitude difference detector 133 adds the corrected values (flicker component) of the respective pixels to the corrected image signal of N−1 frame.

The amplitude difference detector 133 integrates the image signal of N−1 frame, to which the flicker component is added, in the frame unit. The amplitude difference detector 133 generates differential data between the integrated value of N−1 frame and the integrated value of N frame. Further, the amplitude difference detector 133 compares the differential data value obtained based on the amplified flicker-amplitude signal with the differential data value obtained based on the attenuated flicker-amplitude signal, and determines the smaller differential data value. The amplitude difference detector 133 outputs an amplitude-difference signal to the first flicker corrector 134 to instruct to shift the amplitude to the amplified flicker-amplitude signal or the attenuated flicker-amplitude signal, based on which the smaller differential data value is obtained.

In other words, the amplitude difference detector 133 determines one of the amplified flicker amplitude and the attenuated flicker amplitude, which may be closer to the real flicker. The amplitude difference detector 133 supplies one of the amplified amplitude-difference signal and the attenuated amplitude-difference signal, which may be closer to the real flicker, to the first flicker corrector 134.

The above-mentioned processing is repeated for each frame. As a result, the amplitude of a correction wave will gradually become closer to the amplitude of the flicker component of the actual image signal.

The first flicker corrector 134 calculates flicker-correction data, which is used to correct a flicker of N frame, based on the phase-difference signal from the phase difference detector 132 and based on the amplitude-difference signal from the amplitude difference detector 133. The first flicker corrector 134 calculates corrected values of the respective pixels based on the image signal of N frame and based on the flicker-correction data of N frame. The first flicker corrector 134 subtracts the corrected values of the respective pixels from the image signal of N frame. As a result, the first flicker corrector 134 obtains an image signal of each frame whose flicker component is corrected.

The first flicker corrector 134 supplies the image signal, whose flicker component is corrected, to the phase difference detector 132 and the amplitude difference detector 133.

Figure 3:
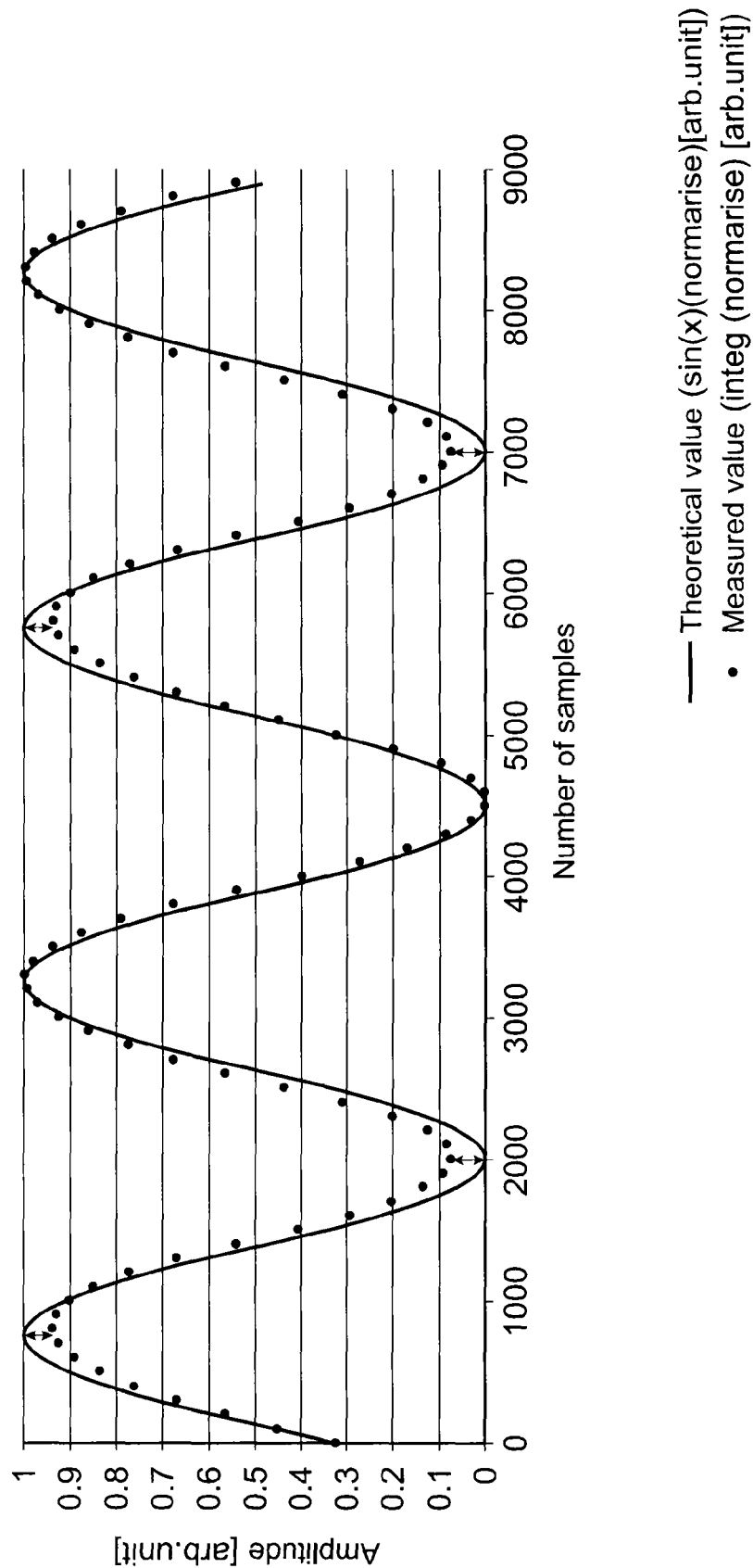
FIG. 3 is a diagram illustrating the principle of the phenomenon, in which part of a flicker is not corrected, in waveform-approximate flicker correction.

As described above, the waveform-approximate-flicker corrector 13 corrects a flicker. The correction follows change of a level of an image signal very well. However, as shown in FIG. 3, a flicker may have various kinds of periodic waveform depending on characteristics of a light source or fluctuation of a power-source frequency. So, in some cases, part of a flicker may not be corrected.

[The Reference-Image-Flicker Corrector 14]

The reference-image flicker correction method of this embodiment is vulnerable to change of a level, but its correction accuracy is high. According to the reference-image flicker correction method, an arithmetic mean of integrated values of image signals, the number of which is the same as the number of frames of the integral multiple of a flicker cycle, is generated. The arithmetic mean is used as a reference image without a flicker. A flicker is corrected by using the reference image. Various kinds of such a reference-image flicker correction methods are already known. The following is an example thereof.

The reference-image-flicker corrector 14 includes the second memory 141, the average-frame-number calculator 142, the reference image generator 143, and the second flicker corrector 144.

The second memory 141 stores integrated values of respective frames, each of whose flicker is corrected by the waveform-approximate-flicker corrector 13. The second memory 141 stores the integrated values of the n latest frames. Here, the number n is referred to as F_NUM (n=F_NUM).

The average-frame-number calculator 142 calculates the number of frames (F_NUM), which are used to generate a reference image.

F_NUM is obtained based on the following formula.

$$F\_NUM = LCM(\text{power-source frequency} \times 2, \text{frame rate})/(\text{power-source frequency} \times 2) \quad (1)$$

Here, LCM (Element 1, Element 2) is the least common multiple of Element 1 and Element 2. For example, if a power-source frequency is 50 Hz and a frame rate is 240 P, F_NUM is "12".

The reference image generator 143 reads the integrated values of continuous F_NUM frames closer to the present frame from the second memory 141. The reference image generator 143 generates the arithmetic mean of the integrated values as a reference image. Alternatively, the reference image generator 143 outputs the integrated value, which is corrected by the waveform-approximate-flicker corrector 13 (flicker correction), as it is as a reference image.

The level-change detector 15 supplies a signal to notify the reference image generator 143 of a level-change point. The reference image generator 143 behaves as follows based on the signal.

In short, if the level-change detector 15 supplies a signal to notify the reference image generator 143 of a level-change point, the reference image generator 143 outputs the integrated value, which is corrected by the waveform-approximate-flicker corrector 13 (flicker correction), as it is as a reference image.

Further, if the level-change detector 15 does not supply a signal to notify the reference image generator 143 of a level-change point, the reference image generator 143 reads the integrated values of the continuous F_NUM frames closer to the present frame from the second memory 141. The reference image generator 143 generates the arithmetic mean of the integrated values as a reference image.

In general, if two flicker-correction circuits are used in combination, one of the following systems may be used. According to one system, each flicker-correction circuit has a correction circuit to correct an image signal, and one circuit is selected based on the result of the level-change detector 15. According to another system, alpha blending is performed based on a level change degree output from the level-change detector 15. However, according to this embodiment, there is provided no redundant circuit configured to use the former correction result as the latter reference image if the level-change detector 15 supplies a signal to notify the reference image generator 143 of a level-change point as the result of the level-change detector 15.

Further, if the level-change detector 15 does not supply a signal to notify the reference image generator 143 of a level-change point, and if the second memory 141 does not store integrated values of F_NUM frames, the reference image generator 143 reads the integrated values, the number of which is the same as the number of frames within the elapsed time, from the second memory 141. The reference image generator 143 outputs the arithmetic mean (result) of the integrated values as a reference image.

In a general reference-image flicker correction method, after a level is changed, a flicker is corrected properly only after the integrated values of F_NUM frames are stored. However, according to this embodiment, correction of a flicker in the former stage has resistance to change of a level. So a flicker is corrected properly before the integrated values of F_NUM frames are stored.

The second flicker corrector 144 generates a corrected value by using the following formula based on the reference image generated by the reference image generator 143 and based on the integrated value of the present frame.

$$\text{Corrected value} = \text{integrated value}/\text{reference image} \quad (2)$$

The second flicker corrector 144 corrects a flicker of an image signal by using the following formula based on the corrected value.

$$\text{Corrected image signal} = \text{image signal} \times \text{corrected value} \quad (3)$$

Next, the level-change detector 15 will be described.

The level-change detector 15 detects a large level-change point (frame) resulting from for example a large movement (change) or the like of an image based on the differential between the integrated value of N frame and the integrated value of N−1 frame, which are corrected by the waveform-approximate-flicker corrector 13, and the like. If the level-change detector 15 detects a large level-change point, the level-change detector 15 notifies the reference-image-flicker corrector 14 of a signal showing the level-change point. If the level-change detector 15 does not detect a large level-change point, the level-change detector 15 does not notify the reference-image-flicker corrector 14 of a signal showing a level-change point. Note that, according to the present technology, any method of detecting a level-change point may be used.

Figure 4:
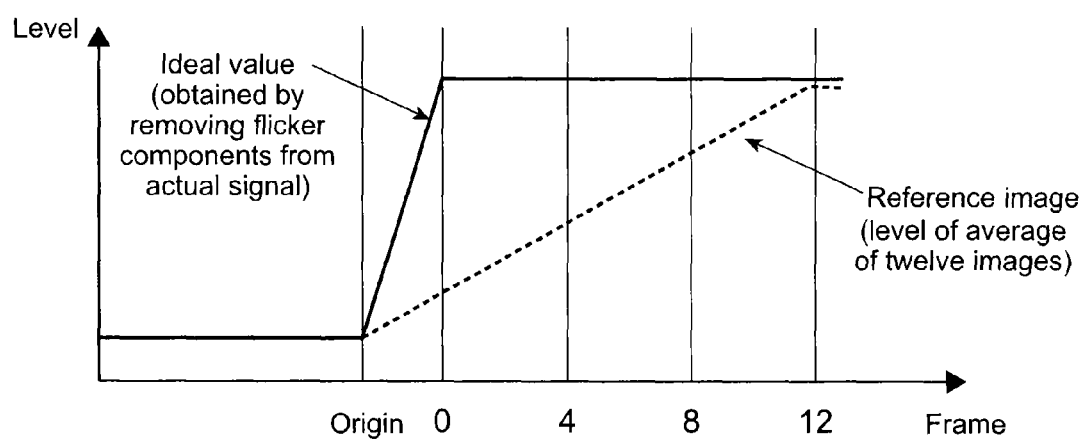
FIG. 4 is a diagram showing characteristics before and after a level is changed in reference-image flicker correction.

Meanwhile, if reference-image flicker correction is solely used, it is not possible to correct a flicker appropriately if there is a level change. In short, as shown in FIG. 4, the arithmetic mean of the integrated values of F_NUM frames (including the integrated value of the frame whose level is changed) is obtained as a reference image. If the time at which a reference image is created is closer to the time at which a level is changed, the reference image is more affected by the differential between the integrated values before and after the level change. So the reference image is largely different from the ideal reference image.

In order to solve this problem, there is known a method of stopping correcting a flicker when a level is changed (Japanese Patent Application Laid-open No. 2000-324365, claim 7). However, according to this method, a flicker is corrected only after integrated values of F_NUM frames necessary to correct a flicker are stored in a memory.

[Overall Behavior]

Next, the overall behavior of the flicker corrector 1 of this embodiment will be described.

Figure 2:
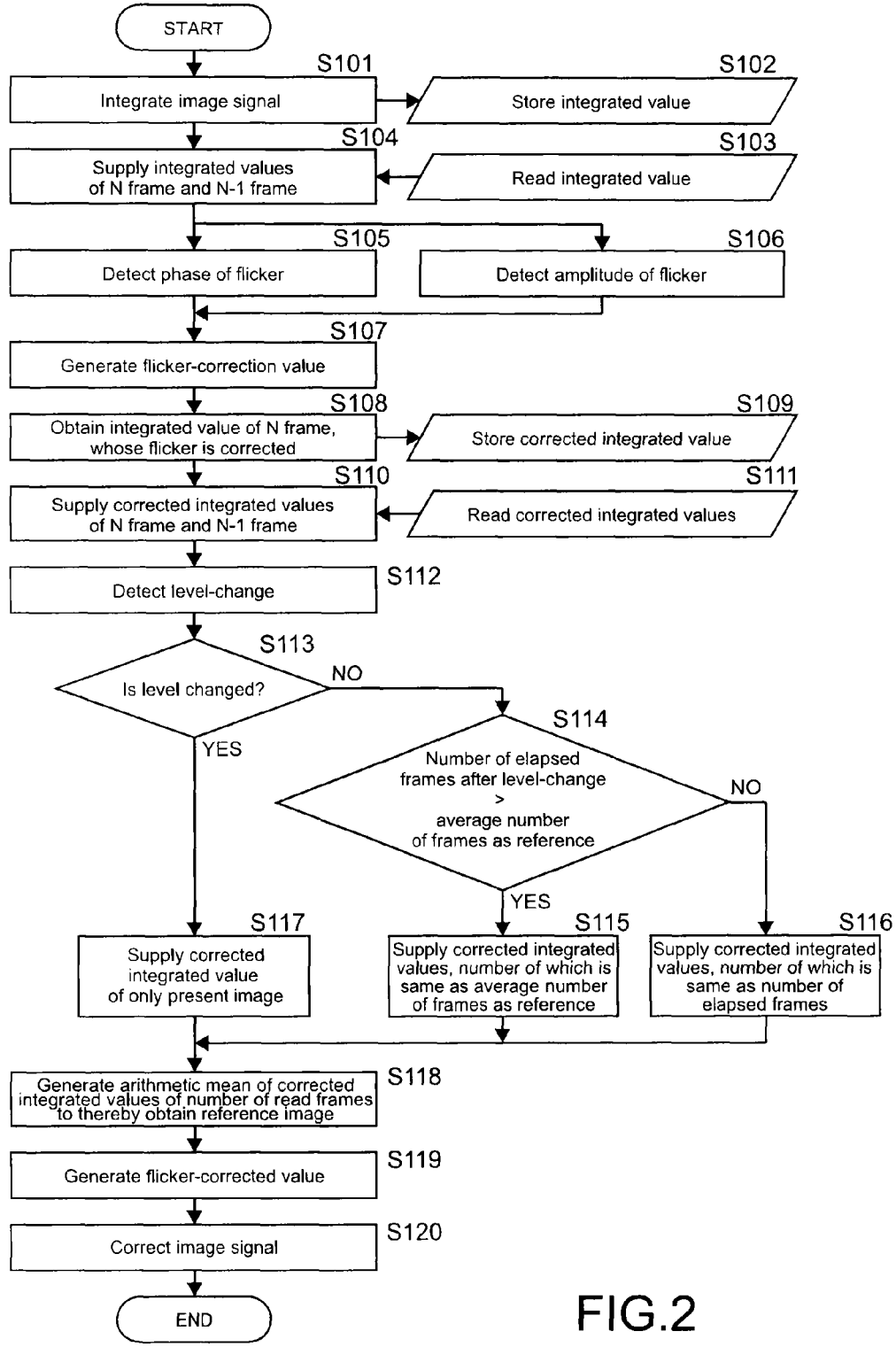
FIG. 2 is a flowchart showing the behavior of the flicker corrector of FIG. 1.

FIG. 2 is a flowchart showing the sequence of the behavior.

Firstly, the image integrator 11 integrates values (e.g., brightness values) of the pixels of respective frames of an input image signal (Step S101).

The first memory 12 stores the integrated value (Step S102). The first memory 12 stores the integrated value of the frame (N−1 frame) immediately before the input present frame (N frame).

Next, the waveform-approximate-flicker corrector 13 reads the integrated value of N−1 frame from the first memory 12. The integrated value is supplied to the waveform-approximate-flicker corrector 13 (Step S103). In addition, the image integrator 11 supplies the integrated value of N frame to the waveform-approximate-flicker corrector 13 (Step S104).

After that, the phase difference detector 132 of the waveform-approximate-flicker corrector 13 detects the phase of a flicker component, as described above (Step S105). Further, the amplitude difference detector 133 detects the amplitude of the flicker component, as described above (Step S106).

Next, the first flicker corrector 134 of the waveform-approximate-flicker corrector 13 calculates flicker-correction data, which is used to correct a flicker of N frame, based on a phase-difference signal supplied from the phase difference detector 132 and based on an amplitude-difference signal supplied from the amplitude difference detector 133 (Step S107).

The first flicker corrector 134 calculates corrected values of the respective pixels based on the image signal of N frame and based on the flicker-correction data of N frame. The first flicker corrector 134 subtracts the corrected values of the respective pixels from the image signal of N frame. As a result, the first flicker corrector 134 obtains the integrated value of N frame, whose flicker component is corrected (Step S108).

The second memory 141 of the reference-image-flicker corrector 14 stores the integrated value, whose flicker component is corrected by the first flicker corrector 134 (Step S109).

Subsequently, the integrated values of N−1 frame and N frame output from the waveform-approximate-flicker corrector 13 are supplied to the level-change detector 15 (Steps S110, S111).

The level-change detector 15 detects presence/absence of a large level-change point resulting from for example a large movement (change) or the like of an image based on the differential between the integrated value of N frame and the integrated value of N−1 frame and the like. The level-change detector 15 supplies the result to the reference image generator 143 of the reference-image-flicker corrector 14 (Step S112).

The reference image generator 143 of the reference-image-flicker corrector 14 dynamically changes the number of frames, which are used to generate a reference image, based on presence/absence of a signal from the level-change detector 15, which is to notify the reference image generator 143 of a level-change point, as follows.

If a signal to notify of a level-change point is not supplied to the reference image generator 143 of the reference-image-flicker corrector 14 (Step S113, N), the reference image generator 143 reads the integrated values of the continuous F_NUM frames closer to N frame from the second memory 141. The reference image generator 143 generates the arithmetic mean of the integrated values as a reference image (Y of Step S114, Steps S115, S118). Alternatively, in this case, the second memory 141 may not store the integrated values of F_NUM frames (Step S114, N). In this case, the reference image generator 143 of the reference-image-flicker corrector 14 reads the integrated values, the number of which is the same as the number of frames within the elapsed time, from the second memory 141. The reference image generator 143 outputs the arithmetic mean (result) of the integrated values as a reference image (Steps S116, S118).

If a signal to notify of a level-change point is supplied to the reference image generator 143 of the reference-image-flicker corrector 14 (Step S113, Y), the reference image generator 143 outputs the integrated value, which is corrected by the waveform-approximate-flicker corrector 13 (flicker correction), as it is as a reference image (Steps S117, S118).

As described above, the reference image generator 143 of the reference-image-flicker corrector 14 obtains a reference image at every frame time.

The reference image generator 143 supplies the thus-obtained reference image to the second flicker corrector 144. The second flicker corrector 144 generates a corrected value by using the formula (2) based on the reference image and the integrated value of N frame (Step S119). The second flicker corrector 144 corrects a flicker of the image signal by using the formula (3) based on the corrected value (Step S120).

As described above, according to the flicker corrector 1 of this embodiment, the waveform-approximate-flicker corrector 13 corrects an integrated value of each frame (primary flicker correction). The waveform-approximate-flicker corrector 13 inputs the result of the primary flicker correction to the reference-image-flicker corrector 14. The reference-image-flicker corrector 14 corrects (secondary correction) the corrected (primary flicker correction) integrated value by using a reference image. So, if a level change is unsuitable for reference-image flicker correction, the waveform-approximate-flicker corrector 13 corrects (primary correction) an integrated value, and the reference-image-flicker corrector 14 corrects (secondary correction) a flicker based on the corrected integrated value as a reference image. As a result, it is possible to correct a flicker more successfully than only the reference-image flicker correction.

Further, before F_NUM frames are stored after a level change, the arithmetic mean of integrated values of the number of frames within the elapsed time is obtained. A flicker is corrected by using the arithmetic mean as a reference image. As a result, it is possible to correct a flicker successfully even in this period of time.

Second Embodiment

The present technology is applicable not only to the above-mentioned flicker corrector configured to correct a surface flicker generated in a global-shutter-type image sensor. The present technology is applicable but also to a flicker corrector configured to correct a line flicker generated in a rolling-shutter-type image sensor.

Figure 5:
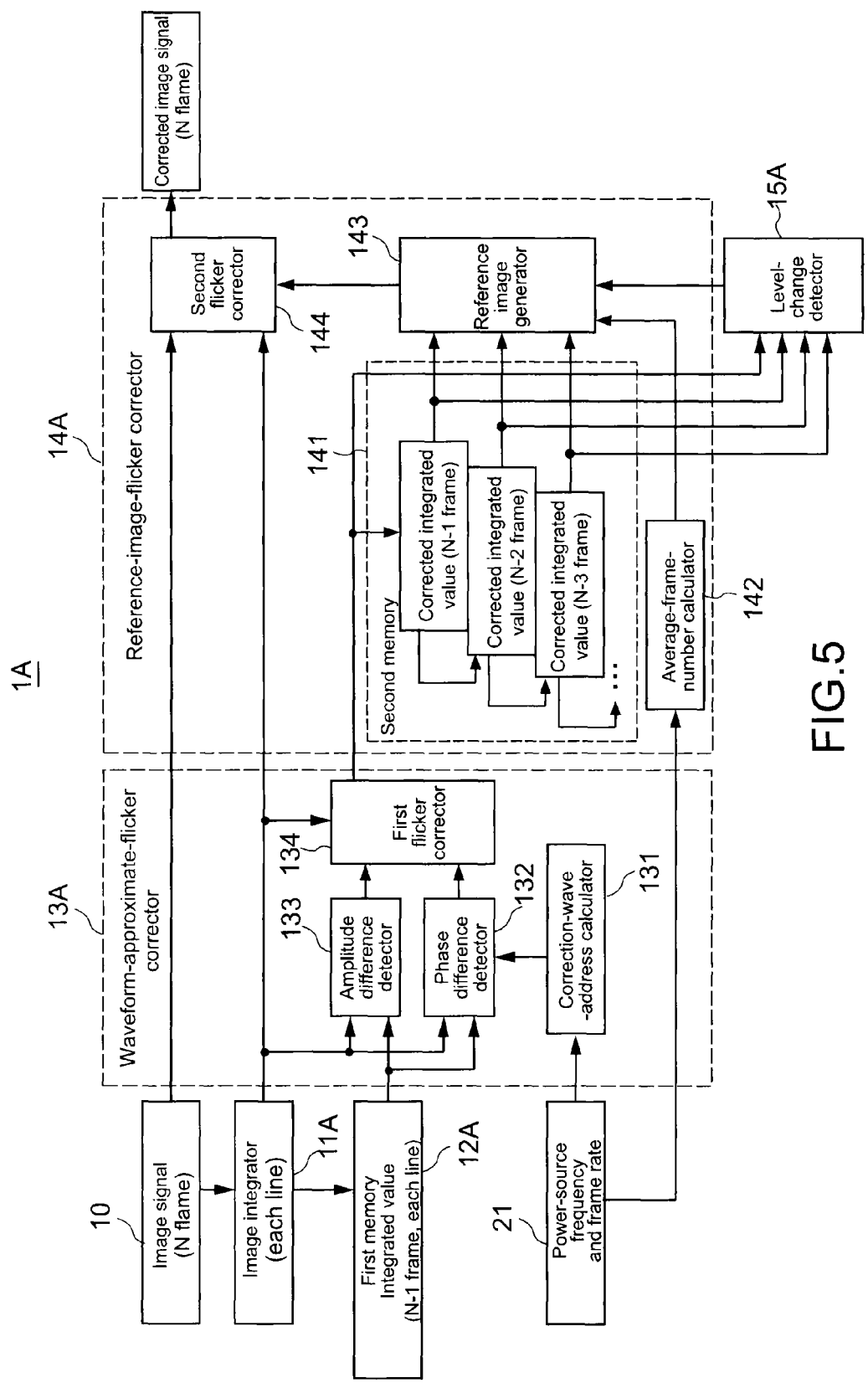
FIG. 5 is a block diagram showing the configuration of the flicker corrector of the second embodiment of the present technology.

FIG. 5 is a block diagram showing the configuration of the flicker corrector 1A configured to correct a line flicker.

The flicker corrector 1A of this embodiment is mainly different from the flicker corrector 1 of the first embodiment as follows. In the first embodiment, the flicker corrector 1 integrates pixel values of each frame, performs waveform-approximate flicker correction of each frame, and performs reference-image flicker correction of each frame. To the contrary, according to the second embodiment, the flicker corrector 1A integrates pixel values of each line, performs waveform-approximate flicker correction of each line, and performs reference-image flicker correction of each line.

According to this embodiment, the image integrator 11A of the flicker corrector 1A integrates values (e.g., brightness values) of pixels of respective lines of respective frames of an input image signal.

The image integrator 11 thereby obtains integrated values of the respective lines of the frames. The first memory 12A stores the integrated values of the respective lines of the frame (N−1 frame) immediately before the present frame (N frame).

The waveform-approximate-flicker corrector 13A approximates the phase and amplitude of a flicker, and thereby generates a waveform such as a sine wave. The waveform-approximate-flicker corrector 13A corrects the integrated values of the respective lines, which are output from the image integrator 11A, based on the waveform. The waveform-approximate-flicker corrector 13A thereby performs primary flicker correction.

The reference-image-flicker corrector 14 generates a reference image of each line of each frame of the integral multiple of a flicker cycle. The generated reference image has a less flicker component. The reference image is the integrated value of each line of each frame, which is corrected by the waveform-approximate-flicker corrector 13. Alternatively, the reference image is the arithmetic mean of the integrated values of the same lines of a plurality of frames, which are corrected by the waveform-approximate-flicker corrector 13.

The level-change detector 15A detects a large level-change point (frame) resulting from for example a large movement (change) or the like of an image based on the differential between the integrated value of one line of N frame and the integrated value of the same line of N−1 frame, which are corrected by the waveform-approximate-flicker corrector 13, and the like. The level-change detector 15A notifies the reference-image-flicker corrector 14A of the detected level-change point.

Next, how the flicker corrector 1A of this embodiment corrects a line flicker will be described.

Figure 6:
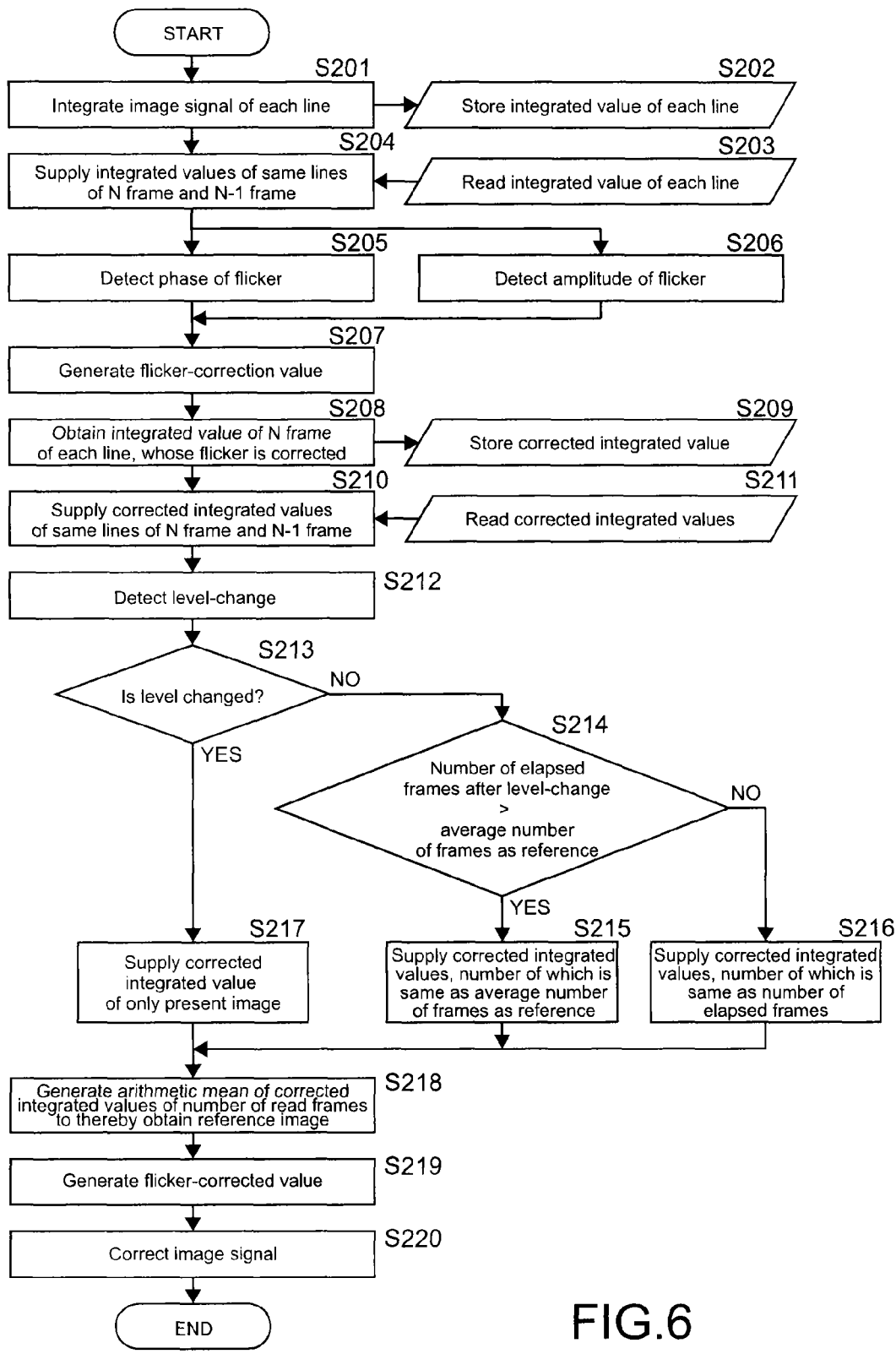
FIG. 6 is a flowchart showing the behavior of the flicker corrector of FIG. 5.

FIG. 6 is a flowchart showing the sequence of the behavior.

Firstly, the image integrator 11A integrates values (e.g., brightness values) of the pixels of respective lines of an input image signal (Step S201).

The first memory 12A stores the integrated values (Step S202). The first memory 12A stores the integrated values of the respective lines of the frame (N−1 frame) immediately before the input present frame (N frame).

Next, the waveform-approximate-flicker corrector 13A reads the integrated value of each line of N−1 frame from the first memory 12A. The integrated value is supplied to the waveform-approximate-flicker corrector 13A (Step S203). In addition, the image integrator 11A supplies the integrated value of the same line of N frame to the waveform-approximate-flicker corrector 13A (Step S204).

After that, the phase difference detector 132 of the waveform-approximate-flicker corrector 13A detects the phase of a flicker component (Step S205). Further, the amplitude difference detector 133 detects the amplitude of the flicker component (Step S206).

Next, the first flicker corrector 134 of the waveform-approximate-flicker corrector 13A calculates flicker-correction data, which is used to correct a flicker of each line of N frame, based on a phase-difference signal supplied from the phase difference detector 132 and based on an amplitude-difference signal supplied from the amplitude difference detector 133 (Step S207).

The first flicker corrector 134 calculates corrected values of the respective pixels based on the image signal of each line of N frame and the flicker-correction data of each line of N frame. The first flicker corrector 134 subtracts the corrected values of the respective pixels from the image signal of N frame. The first flicker corrector 134 obtains the integrated value of each line of N frame, whose flicker component is corrected (Step S208).

The second memory 141 of the reference-image-flicker corrector 14A stores the integrated value of each line, whose flicker component is corrected by the first flicker corrector 134 (Step S209).

Subsequently, the integrated values of the same lines of N−1 frame and N frame output from the waveform-approximate-flicker corrector 13A are supplied to the level-change detector 15A (Steps S210, S211).

The level-change detector 15A detects presence/absence of a large level-change point resulting from for example a large movement (change) or the like of an image based on the differential between the integrated value of N frame and the integrated value of N−1 frame and the like. The level-change detector 15A supplies the result to the reference image generator 143 of the reference-image-flicker corrector 14A (Step S212).

The reference image generator 143 of the reference-image-flicker corrector 14A dynamically changes the number of frames, which are used to generate a reference image, based on presence/absence of a signal from the level-change detector 15A, which is to notify the reference image generator 143 of a level-change point, as follows.

If a signal to notify of a level-change point is not supplied to the reference image generator 143 of the reference-image-flicker corrector 14A (Step S213, N), the reference image generator 143 reads integrated values of the same lines of continuous F_NUM frames closer to N frame from the second memory 141. The reference image generator 143 generates the arithmetic mean of the integrated values as a reference image (Y of Step S214, Steps S215, S218). Alternatively, in this case, the second memory 141 may not store the integrated values of respective lines of F_NUM frames (Step S214, N). In this case, the reference image generator 143 of the reference-image-flicker corrector 14A reads integrated values of the same lines, the number of which is the same as the number of frames within the elapsed time, from the second memory 141. The reference image generator 143 outputs the arithmetic mean (result) of the integrated values as a reference image (Steps S216, S218).

If a signal to notify of a level-change point is supplied to the reference image generator 143 of the reference-image-flicker corrector 14A (Step S213, Y), the reference image generator 143 outputs the integrated value, which is corrected by the waveform-approximate-flicker corrector 13A (flicker correction), as it is as a reference image (Steps S217, S218).

As described above, the reference image generator 143 of the reference-image-flicker corrector 14A obtains a reference image of each line at every frame time.

The reference image generator 143 supplies the thus-obtained reference image of each line to the second flicker corrector 144. The second flicker corrector 144 generates a corrected value by using the formula (2) based on the reference image and the integrated value of each line of N frame (Step S219). The second flicker corrector 144 corrects a flicker of the image signal by using the formula (3) based on the corrected value (Step S220).

As described above, the present technology is also applicable to a flicker corrector configured to correct a line flicker generated in a rolling-shutter-type image sensor.

Note that the above-mentioned waveform-approximate flicker correction method and reference-image flicker correction method are merely examples. The present technology is applicable to various types of other waveform-approximate flicker correction methods and reference image flicker correction methods.

Note that the present technology may employ the following configurations.

(1) An image signal processor, including:
an integrator configured to integrate each frame of an image signal;
a first flicker corrector configured
to extract a flicker component from the integrated value obtained by the integrator, the flicker component depending on a frequency of a light source, and
to reduce a flicker component from the integrated value sequentially; and
a second flicker corrector configured
to generate a reference image without a flicker component based on the correction result of the integrated value corrected by the first flicker corrector, and
to correct a flicker of the image signal based on the reference image.

(2) The image signal processor according to (1), further including:
a level-change detector configured to detect a significant level change between continuous frames, in which
the second flicker corrector further includes a storage, the storage being capable of storing integrated values of a predetermined number of frames, the predetermined number being determined depending on a power-source frequency and a frame rate of the light source, and
the second flicker corrector is configured to, if the level change is not detected, calculate the average of integrated values of a predetermined number of latest frames stored in the storage to thereby generate the reference image.

(3) The image signal processor according to (2), in which
the second flicker corrector is configured to, if the level change is detected, correct a flicker of the image signal based on the integrated value output from the first flicker corrector as the reference image.

(4) The image signal processor according to (2) or (3), in which
the level-change detector is configured to detect the level change based on the integrated value corrected by the first flicker corrector.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processor, comprising:
circuitry configured to
integrate each frame of an image signal;
extract a flicker component from integrated value obtained by the circuitry, the flicker component depending on a frequency of a light source;
reduce a flicker component from the integrated value sequentially;
generate a reference image without a flicker component based on a correction result of the integrated value corrected by the circuitry;
correct a flicker of the image signal based on the reference image;
detect a level change between continuous frames, which are continuous in time direction;
store integrated values of a predetermined number of frames, the predetermined number being determined depending on a power-source frequency and a frame rate of the light source;
in case that the level change is not detected, calculate an average of integrated values of a predetermined number of latest frames stored in the circuitry to thereby generate the reference image; and
in case that the level change is detected, correct a flicker of the image signal based on the integrated value of only present image output from the circuitry as the reference image.

2. The image signal processor according to claim 1, wherein
the circuitry is configured to detect the level change based on the integrated value corrected by the circuitry.

3. An image signal processor, comprising:
circuitry configured to
integrate each line of an image signal;
extract a flicker component from integrated value of each line obtained by the circuitry, the flicker component depending on a frequency of a light source;
reduce a flicker component from the integrated value of each line sequentially;
generate a reference image without a flicker component based on a correction result of the integrated value of each line corrected by the circuitry;
correct a flicker of the image signal based on the reference image;
detect a level change between continuous frames, which are continuous in time direction;
store integrated values of a predetermined number of frames, the predetermined number being determined depending on a power-source frequency and a frame rate of the light source;
in case that the level change is not detected, calculate an average of integrated values of a predetermined number of latest frames stored in the circuitry to thereby generate the reference image; and
in case that the level change is detected, correct a flicker of the image signal based on the integrated value of only present image output from the circuitry as the reference image.

4. An image signal processing method, comprising:
integrating, using circuitry, each frame of an image signal;
extracting, using the circuitry, a flicker component from integrated value obtained by the circuitry, the flicker component depending on a frequency of a light source;
reducing a flicker component from the integrated value sequentially;
generating, using the circuitry, a reference image without a flicker component based on a correction result of the integrated value corrected by the circuitry;
correcting a flicker of the image signal based on the reference image;
detecting a level change between continuous frames, which are continuous in time direction;
storing integrated values of a predetermined number of frames, the predetermined number being determined depending on a power-source frequency and a frame rate of the light source;
in case that the level change is not detected, calculating an average of integrated values of a predetermined number of latest frames stored in the circuitry to thereby generate the reference image; and in case that the level change is detected, correcting a flicker of the image signal based on the integrated value of only present image output from the circuitry as the reference image.

5. An image signal processing method, comprising:

integrating, using circuitry, each line of an image signal;

extracting, using the circuitry, a flicker component from integrated value of each line obtained by the circuitry, the flicker component depending on a frequency of a light source;

reducing a flicker component from the integrated value of each line sequentially;

generating, using the circuitry, a reference image without a flicker component based on a correction result of the integrated value of each line corrected by the circuitry;

correcting a flicker of the image signal based on the reference image;

detecting a level change between continuous frames, which are continuous in time direction;

storing integrated values of a predetermined number of frames, the predetermined number being determined depending on a power-source frequency and a frame rate of the light source;

in case that the level change is not detected, calculating an average of integrated values of a predetermined number of latest frames stored in the circuitry to thereby generate the reference image; and in case that the level change is detected, correcting a flicker of the image signal based on the integrated value of only present image output from the circuitry as the reference image.

6. A non-transitory computer readable medium including executable instructions, which when executed by a computer cause the computer to:

integrate each frame of an image signal;

extract a flicker component from integrated value obtained by the computer, the flicker component depending on a frequency of a light source;

reduce a flicker component from the integrated value sequentially;

generate a reference image without a flicker component based on a correction result of the integrated value corrected by the computer;

correct a flicker of the image signal based on the reference image;

detect a level change between continuous frames, which are continuous in time direction;

store integrated values of a predetermined number of frames, the predetermined number being determined depending on a power-source frequency and a frame rate of the light source;

in case that the level change is not detected, calculate an average of integrated values of a predetermined number of latest frames stored in the computer to thereby generate the reference image; and in case that the level change is detected, correct a flicker of the image signal based on the integrated value of only present image output from the computer as the reference image.

7. A non-transitory computer readable medium including executable instructions, which when executed by a computer cause the computer to:

integrate each line of an image signal;

extract a flicker component from integrated value of each line obtained by the computer, the flicker component depending on a frequency of a light source;

reduce a flicker component from the integrated value of each line sequentially;

generate a reference image without a flicker component based on a correction result of the integrated value of each line corrected by computer correct a flicker of the image signal based on the reference image;

detect a level change between continuous frames, which are continuous in time direction;

store integrated values of a predetermined number of frames, the predetermined number being determined depending on a power-source frequency and a frame rate of the light source;

in case that the level change is not detected, calculate an average of integrated values of a predetermined number of latest frames stored in the computer to thereby generate the reference image; and in case that the level change is detected, correct a flicker of the image signal based on the integrated value of only present image output from the computer as the reference image.

* * * * *